United States Patent [19]

Lombard

[11] 4,366,622
[45] Jan. 4, 1983

[54] APPARATUS FOR CUTTING VEGETATION
[75] Inventor: Marco H. Lombard, Austin, Tex.
[73] Assignee: Emerson Electric Co., St. Louis, Mo.
[21] Appl. No.: 256,788
[22] Filed: Apr. 23, 1981

Related U.S. Application Data

[62] Division of Ser. No. 53,592, Jun. 29, 1979, Pat. No. 4,290,200.

[51] Int. Cl.³ .............................................. A01D 50/00
[52] U.S. Cl. ........................................ 30/276; 56/12.7
[58] Field of Search .................... 30/276, 347; 56/12.7

[56] References Cited

U.S. PATENT DOCUMENTS

| | | | |
|---|---|---|---|
| 2,340,184 | 1/1944 | Gray | 223/107 |
| 3,009,611 | 11/1961 | Bates | 223/106 |
| 4,236,312 | 12/1980 | Foster | 30/276 |
| 4,244,103 | 1/1981 | Snarr | 30/276 |
| 4,290,200 | 9/1981 | Lombard | 30/276 |

FOREIGN PATENT DOCUMENTS

556632 12/1974 Fed. Rep. of Germany .

Primary Examiner—Jimmy C. Peters
Attorney, Agent, or Firm—Hubbard, Thurman, Turner & Tucker

[57] ABSTRACT

Apparatus for cutting vegetation with a rotatable head carrying a non-metallic cutting line extended into a cutting plane. A supply line coil is carried within the head. A mechanism in the head automatically feeds replacement line from the coil to constantly maintain a predetermined maximum length in the cutting plane. The cutting line length is extended immediately when any length of cutting line is lost to wear or breakage. The line-feeder mechanism feeds replacement cutting line at a rate proportional to the length of replacement cutting line.

9 Claims, 26 Drawing Figures

APPARATUS FOR CUTTING VEGETATION

This application is a division of application Ser. No. 053,592, filed June 29, 1979, now U.S. Pat. No. 4,290,200, issued Sept. 22, 1981.

BACKGROUND OF THE INVENTION

1. Field of the Invention

This invention relates to the cutting of vegetation, and more particularly, it relates to the cutting of vegetation using a flexible, non-metallic cutting line extending from a rotating head into a cutting plane.

2. Description of Prior Art

Various types of devices have been proposed for many years to facilitate the removal of vegetation by mowing, trimming, edging and like cutting operations. In general, these devices have employed a metal blade to effect vegetation removal. Devices of this nature employ prime movers such as electric and gasoline motors. As a result, rotating metal blades can inflict serious and terrible injury upon the user.

In about 1960, there was developed in Europe a trimmer/edger unit employing a flexible polymeric line extending from a rotating head for cutting vegetation. This unit did not work properly because of several defects in structure and operating parameters. In the United States of America, practical vegetation-cutting devices using flexible, non-metallic lines carried upon a rotating head were developed. The devices are shown in U.S. Pat. Nos. 3,708,967, 3,826,068, 4,052,789, 4,054,992, 4,067,108 and 4,104,797. These patented devices have met outstanding success in that these American developments provide safer electrical or gasoline-powered tools for vegetation cutting, edging and trimming operations.

The devices shown in these patents employ a flexible cutting line, such as manufactured from Nylon ® polymer. The cutting line is carried usually upon a spool internally of a rotating head. When desired to replenish the line or to extend an additional length of it, the rotation of the head was stopped and line manually extended from the spool. This line-extension procedure in the patented devices has been found to be convenient, simple and reliable. In many of the more powerful devices, especially those powered by d.c. electric motors, a system was desired to extend automatically the cutting line from the head without interrupting cutting operations.

A most desirable automatic system would be capable of feeding cutting line as needed from the head so that line-feeding is independent of operator action during grass cutting. Structures directed toward this purpose are shown in U.S. Pat. Nos. 3,895,440, 4,020,550 and 4,035,915. These structures have in common a basket-weave supply of cutting line carried on the periphery of a disc with the line feeding from behind special post members. These post members have a cutting-abrading edge so that cutting line from the weave supply is bent about such edge in the free-traveling end portion extending into the cutting plane. The combination function of the edge, line, angular speed, etc., is arranged so that the line posts with such edge sever the free end of the cutting line when it is worn to an ineffective length. In practice, these structures are found to waste about 25 percent of the cutting line because of the excessive length of line severed at the post's edge, e.g., between one and three inches.

These structures in "automatic" line-feeding suffer a serious hysteresis, or snap-action problem. For example, these cutting heads may provide a maximum vegetation-cutting path of 18 inches. However, the cutting line may not begin to feed until it is reduced to a cutting path of ten inches. Then, the cutting line suddenly feeds to the 18-inch maximum cutting path. Besides the "start" or surprise to the operator, innocent vegetation can be unintentionally cut in what may be termed "Oops, there go the daisies", by the sudden increase in cutting path. Such automatic function can generally be termed as "snap-action line feeders". Also, the hysteresis in the feeder mechanisms may not feed the correct line length each time to restore the maximum cutting path.

The present invention provides a rotating head with a mechanism that maintains automatically and continuously the cutting line at its maximum predetermined length extending in the cutting plane, irrespective of rates of cutting line wear or loss and magnitude of line extension.

SUMMARY OF THE INVENTION

In accordance with this invention, there is provided an apparatus for cutting vegetation which has a head rotatable about an axis of rotation. The head carries a supply of a flexible non-metallic cutting line. The cutting line has a free end which extends outwardly from the head through an aperture into a cutting plane. A cam mechanism controls extension to a predetermined maximum length of the cutting line extending through the aperture into the cutting plane. This cam mechanism includes unitary gripping members that progressively grip the cutting line in proportion to its length extending into the cutting plane. Vibration of the cutting line during vegetation-cutting modulates the gripping members into a pulsing-gripping of the cutting line. As a result, dynamic friction conditions predominate between the gripping members and cutting line during control of its extension into the cutting plane.

DESCRIPTION OF THE DRAWINGS

In these drawings, the several embodiments have common elements of construction in the cutting head. In regard to the several figures, like elements carry like numerals to simplify description of these embodiments of the present apparatus.

DESCRIPTION OF SPECIFIC EMBODIMENTS

Figures 1, 2:
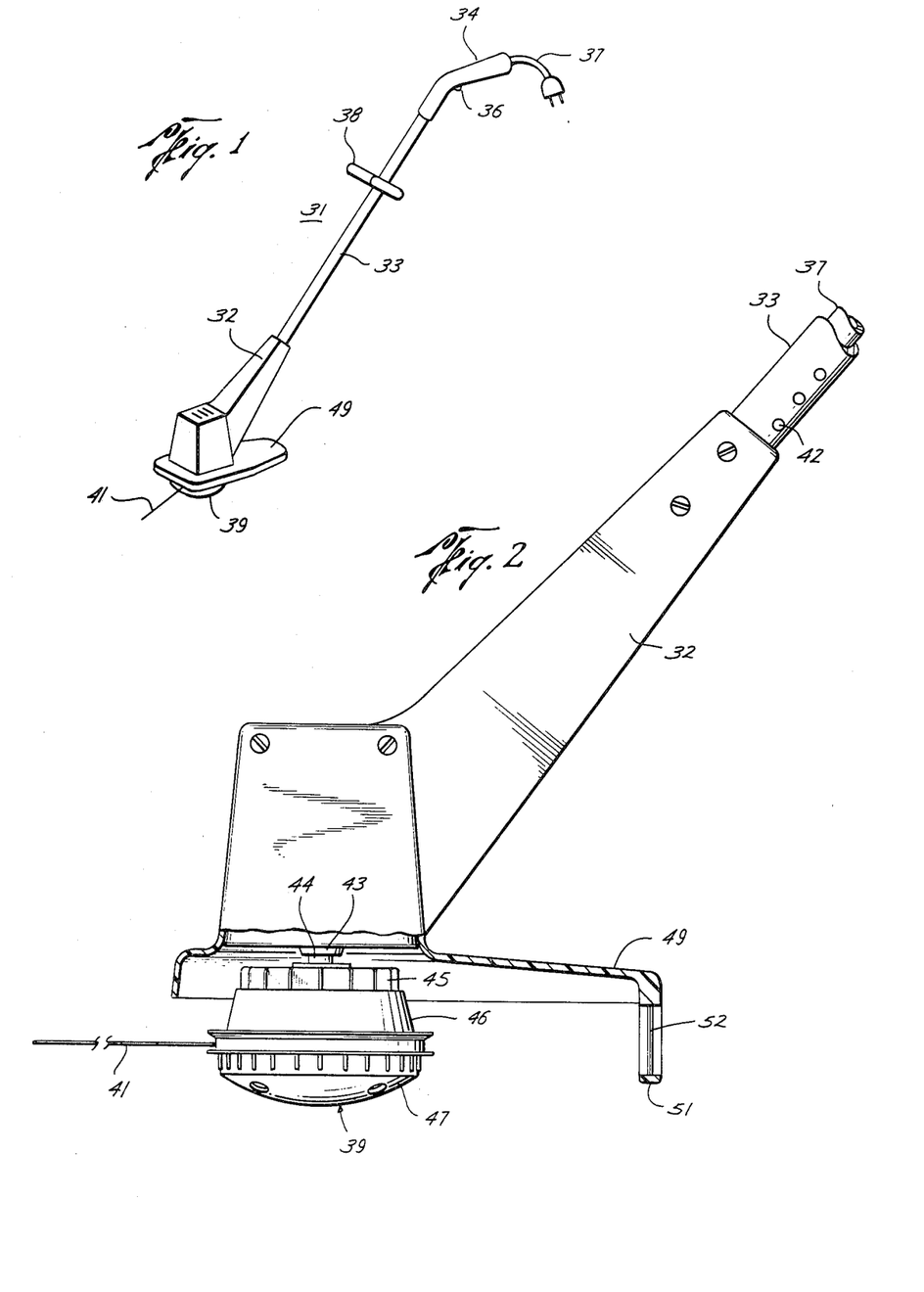
FIG. 1 is a pictorial view illustrating one embodiment of an apparatus for cutting vegetation arranged according to the present invention.
FIG. 2 illustrates, in enlargement, the lower cutting head portion of the apparatus shown in FIG. 1.

Referring to FIG. 1, there is shown an apparatus for cutting vegetation which is constructed in accordance with one embodiment of the present invention. In this particular embodiment, the apparatus is a grass trimmer 31, but it could be a lawnmower, edger or other device for vegetation-cutting purposes. The trimmer 31 has a lower housing 32 interconnected by a tube 33 to a handle assembly 34. The assembly 34 carries a switch 36 for selectively applying electrical power received by a cord 37 to an electrical motor carried within the housing 32. For two-handed operation of the trimmer 31, an auxiliary handle 38 is provided upon the tube 33. The lower housing 32 carries a head 39 rotatable about an axis passing through the housing 32. A cutting line 41 extends from the head into a cutting plane which is substantially perpendicular to the axis of rotation.

In FIG. 2 there is shown an enlargement of the housing 32 carrying a plurality of air-induction openings 42 in the tube 33. These openings introduce a flow of cooling air over the motor contained in the housing 32. The housing 32 includes an electric motor 43 which has a downwardly-extending drive shaft 44. The head 39 is threadedly connected to the shaft 44. The upper surface of the head 39 may be surrounded by a plurality of vanes 45 serving as a centrifugal blower for moving air radially outward from the head 39 during its rotation. As a result, the induced flow of air cools the motor 43 within the housing 32. The head 39 includes a hub 46 and a cover 47. The hub 46 carries in its side peripheral surface an aperture 48 through which the cutting line 41 extends radially into the cutting plane. A metal bearing surface may be placed at the aperture to protect the line 41 against undue wear and breakages. The cover 47 may be secured to the hub 26 by a threaded connection to provide access to the cam mechanism contained within the head.

The housing 32 includes a rearwardly-extending tail part 49 which serves as a protection to the user to prevent inadvertent contact with the rotating cutting line 41. Also, the tail part provides an automatic limit to the excessive extension of the cutting line 41 from the head 39. More particularly, the tail part 49 has a downwardly-extending projection 51 in which is embedded a metal cutting blade 52. As a result, the cutting line 41, when rotated in a cutting plane by the head 39, can never have an operating length greater than the distance from the axis of rotation to the cutting blade 52. Any greater length of cutting line is automatically severed by the blade 52.

Figure 3:
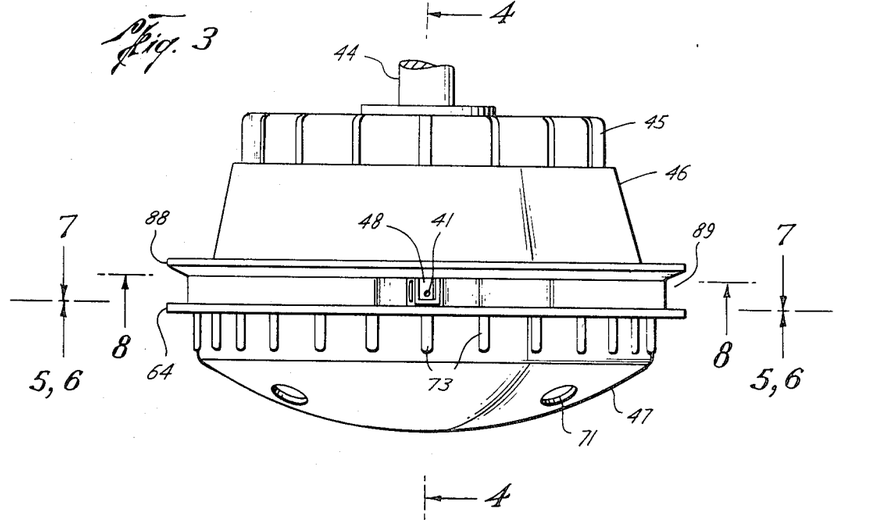
FIG. 3 is an enlarged elevation taken normal to the cutting plane of the cutting head shown in FIG. 2.
Figure 4:
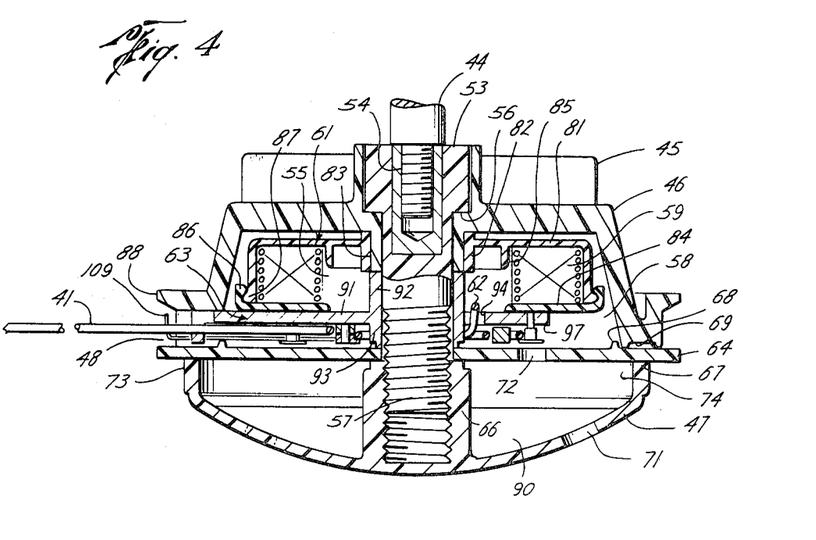
FIG. 4 is a vertical section of the cutting head of FIG. 3 taken along line 4—4.

The head 39, as seen in FIGS. 3 and 4, is disc-like with a smooth peripheral side surface carrying the aperture 48 through which the cutting line 41 extends into the cutting plane. If more than one cutting line is used, each line should have a separate aperture and bearing surface. The hub 46 on one face carries integrally an adapter 53 secured by threads 54 to the drive shaft 44. In addition, the adapter forms a rigid and integral connection between the shaft 44 and the head 39. Preferably, the shaft 44 is cylindrical and the adapter 53 has a flat circular shoulder 56 above its lower terminus 57 to keep the head concentric with this shaft.

The external surfaces of the head 39 should be smooth in surface contour, rounded at the edges and without substantial projections and recesses capable of trapping appreciable vegetation. Preferably, the cover 47 has a smooth exposed surface, is semispherical in configuration with rounded corners, coaxially aligned with the axis of rotation of the head 39.

The hub 46 forms a cavity 55 in cooperation with the cover 47. A supply 59 of coiled cutting line (e.g., Nylon monofilament between 0.035 and 0.100 inches in diameter) is disposed within the cavity 55. The coiled cutting line is free for independent rotational and axial movements within the head 39. Preferably, the coiled cutting line is carried in a spool 61 which can rotate within the head.

The cutting line extends from the spool 61 in an intermediate portion 62 that passes to the cam plate mechanism 63 of the present invention. Then, the cutting line extends radially outward from the head 39 into the fee-end portion of the cutting line 41 within the cutting plane. The cam mechanism 63 may be isolated from the cover 47 by a disc-like cover plate 64. The cover 47 threadedly connects to the adapter 53 by a threaded sleeve 66. Preferably, the cover 47 threads to the adapter 53 counterdirectionally to head rotation to prevent unintended unscrewing in use.

The cover 47 may take any desirable form, but preferably it is a semi-spherical or ball member to assist in guiding the rotating head across vegetation-covered surfaces. In addition, the cover 47 has a cylindrical end 67 which abuts the cover plate 64 when the head is assembled. The cover plate 64 also isolates in the subcavity 58 the cam mechanism 63 below the spool 61.

The cover plate 64 may carry an annular ridge 68 for aligning the cover plate 64 with the lower portion of the hub 46. In many instances, it is desired to prevent dust and debris entrance into the cavity 55 which contains the spool 59. For this purpose a ridge 68 on the cover 64 seals against the end surface of the hub 46. A groove 69 may be formed in the hub 46 to provide spaced-apart rims which further assist in sealing the hub 46 to the cover plate 64.

In many instances, it will be found desirable to provide a flow of cooling air across the cam mechanism 63 in the rotating head 39. However, the cooling air should be free of debris. Otherwise, the action of the cam mechanism could become unreliable through the excessive accumulation of debris encountered in cutting vegetation, such as dust, fibers and small pieces of grass, etc. For this purpose, the head 39 carries a unique arrangement for providing needed cooling air. More particularly, the cover 47 carries one or more openings 71 in its lower surface. The cover plate 64 also carries one or more openings 72 for communication between the openings 71 in the cover 47 and the subcavity 58 of the hub 46. The openings 71 and 72 are not in direct axial alignment. Preferrably, airflow passes from the openings 71 in a tortious path into the openings 72.

Figure 7:
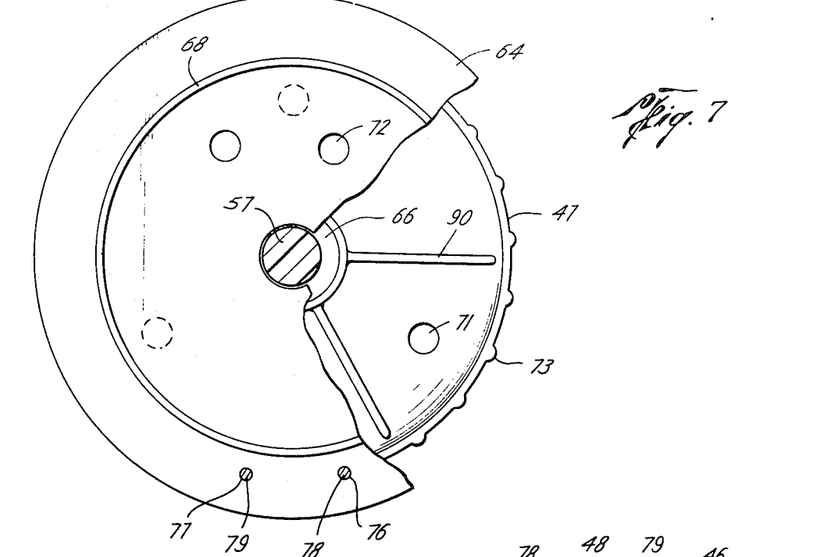
FIG. 7 is a cross-section of the cutting head of FIG. 3, partially broken, taken along line 7—7.

In one embodiment, the opening 71 is angularly displaced from the opening 72 as may be more readily seen in FIG. 7. Alternatively, the openings 71 and 72 may be placed at different radial distances from the axis of rotation, respectively, in the cover 47 and the cover plate 64. Preferably, the openings 71 are at greater radial distances from the axis of rotation than the opening 72. However, the openings may be arranged at both different angular displacement and different radial distances from the axis of rotation specifically as is shown in FIG. 7. With this arrangement, rotation of the head will induce a flow of cooling air through the passageway formed by the openings 71 and 72, about the cam mechanism 63 and then radially outwardly through the aperture 48 in the exterior side surface of the head 39. The debris carried with the cooling air passes in an angular path between the openings 71 and 72. As a result, the centrifugal forces acting upon the debris separate the debris from the flow of cooling air upstream of the cam mechanism 63. The separated debris accumulates on the furthermost radial interior surface of the cover 47, usually at the intersection of the cover 47 with the cover plate 64 (as indicated by the numeral 74).

The cover 47 can be easily unthreaded from the hub 46 to expose the cover plate 64. At this time, any accumulated debris at the region 74 is removed by wiping or blowing it out with air. Then, the cover plate 64 is detached from the head 39 and removed by an axial motion. The cam mechanism 63 is now exposed for axial removal for service or line replacement by insertion of fresh spool 61, as is desired. To assist in manually gripping the cover 47, a plurality of axial or longitudinal ridges 73 are carried on its exterior cylindrical side surface. In order to assure non-rotation of the cover plate 64 relative to the hub 46, the cover 64 carries a one or more openings 76 and 77 in which are received projections or pins 78 and 79 carried on the hub 46. The cover 47 may carry radial ribs 90 to provide additional stiffness for holding the cover 47 and cover plate 64 coaxially in alignment with the drive shaft 44.

Figure 9:
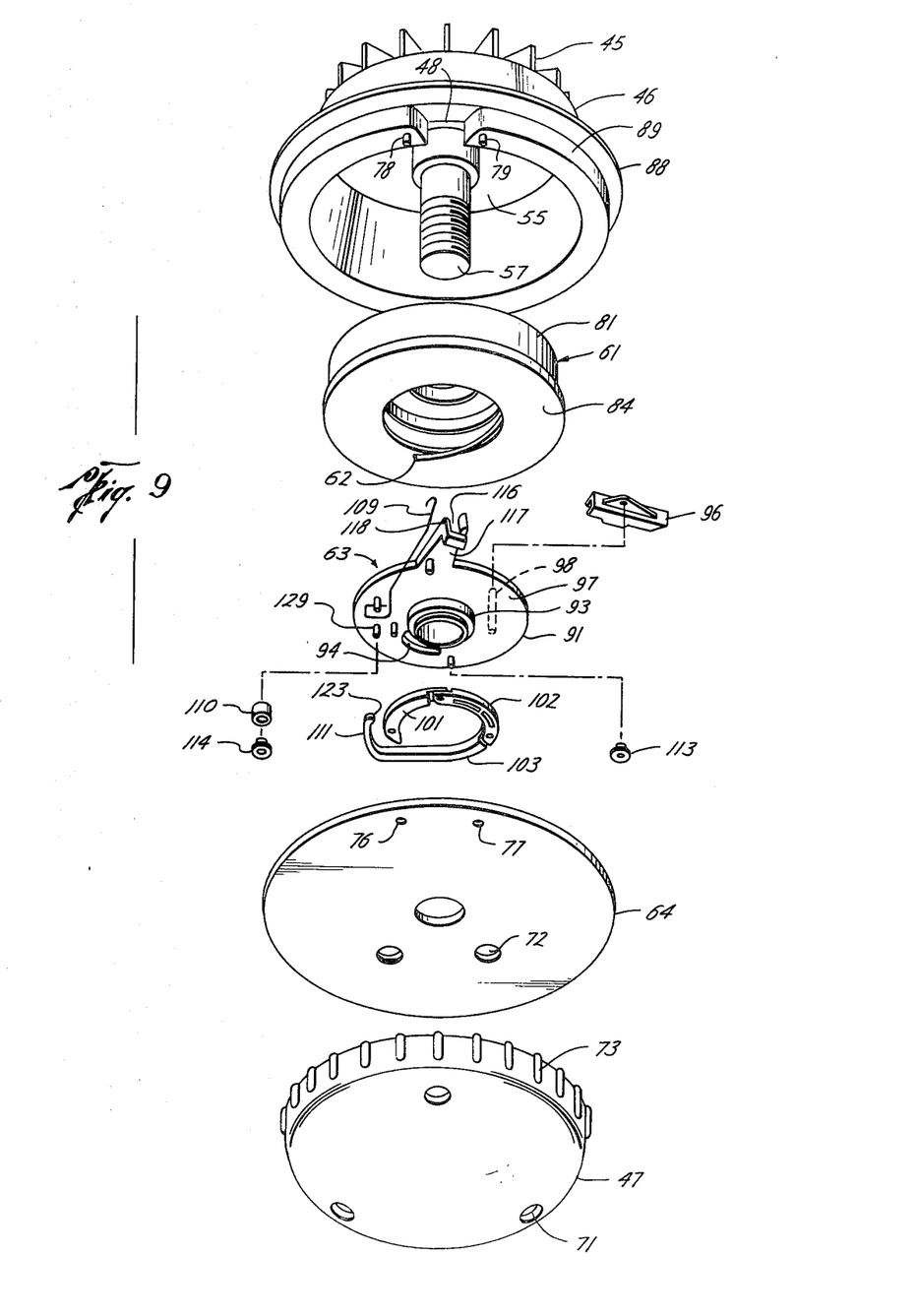
FIG. 9 is a view in disassembly of the cutting head shown in FIG. 3.

Although the supply of line, usually in a coil, can be carried within the cavity 55 in any convenient manner, it is preferable to carry such supply of line within the spool 61. It is preferred that the spool 61 be journaled within the cavity 55 so as to be freely rotatable therein. Thus, the spool 61 can rotate relative to the hub 46 to accomodate the feeding freely of the cutting line from the supply of line 59 and onto the cam mechanism 63. Referring to FIGS. 4 and 9, the spool 61 comprises a cylindrical-shaped cup 81 having an inner cylindrical bearing wall 82 which is journaled upon a cylindrical projection 83 on the hub 46. A second cylindrical wall 85 is provided on the cup 81 for containing the supply of coiled line 59. A disc-like cover 84 with a relatively large central opening is releasably secured to the cup 81. For this purpose, the cover 84 carries an inner rim with rounded projecting nose 86 to "snap over" a complementary nose or outside rim 87 on the cup 81. In this manner, the cover 84 is readily detached from the cup 81 for inserting a supply of coiled line therein whenever the spool 61 is out of the cutting head 39. Alternatively, a fresh spool 61 may replace the exhausted spool in the head 39.

The cam mechanism 63, arranged according to the present invention, provides for controlling the extension to a predetermined maximum length of the cutting line from the rotating head 39 and through the aperture 48 into the cutting plane during the cutting of vegetation. In a preferred embodiment, the cam mechanism 63 provides for extending the cutting line at a rate in proportion to the length required to restore the cutting line 41 to its predetermined maximum length. For example, if only a short length of the cutting line 41 needs to be extended to replace that portion used in wear during vegetation cutting, then the cam mechanism extends this cutting line increment at a first rate. However, should a greater length of the cutting line 41 need to be replaced by extension thereof, the cam mechanism extends such cutting line at a much greater rate. In addition, the cam mechanism 63 is arranged to provide extension of the cutting line immediately upon need without any undue delay or snap-action type line extension. Furthermore, the cam mechanism 63 provides for a progressive gripping of the cutting in proportion to its length extending into the cutting plane from the rotating head 39. More particularly, when the cutting line is at its predetermined maximum length of extension from the cutting head 39, the cam mechanism securely holds the cutting line against any additional extension. However, for any length of the cutting line 41 extending into the cutting plane less than this predetermined maximum, the cam mechanism is under dynamic motion conditions such that the cutting line is being extended into the cutting plane until it reaches the predetermined maximum length. Under these conditions, the cam mechanism 63 can be said to provide for control of the cutting line under dynamic friction conditions at any extended length less than the predetermined maximum length of extension of the cutting line 41 into the cutting plane.

In the cutting head 39, the cutting line 41 cannot be worn or cut to a length less than is required for operation of the cam mechanism 63. For this purpose, the hub 46 carries a projecting annular rim 88 which cooperates with the projecting edge of the cover plate 64 to provide an encircling recess 89. The cutting line 41 is wound into the recess 89, should the head 39 be placed directly against a concrete curb or other abrasive surface, which surface would otherwise sever the cutting line 41 at the aperture 48.

The cam mechanism 63 can take a variety of forms for producing the results desired from the present invention. In the preferred embodiment best shown in FIGS. 5, 6, and 9–11, the cam mechanism has a cam plate 91 carried integrally by the head 39. The cam plate 91 serves as a base upon which the several elements required to control extension to a predetermined maximum length of the cutting line 41 are mounted. The plate 91 is a planar disc-like member which is spaced parallel to the cover 64 and carries a longitudinal extension 117. An elongated opening 94 is provided centrally through the cam plate 91 adjacent upper and lower cylindrical extensions 92 and 93, respectively. These cylindrical extensions telescope over the adapter threaded portion 57 and coaxially mount the cam plate 91 within the cavity 55 of the hub 46. The cylindrical extension 93 forms a round collar on the cam plate 91 on its face 97 presented towards the cover plate 64. The cutting line portion 62 passes through the cam plate 91 via the opening 94.

Figure 8:
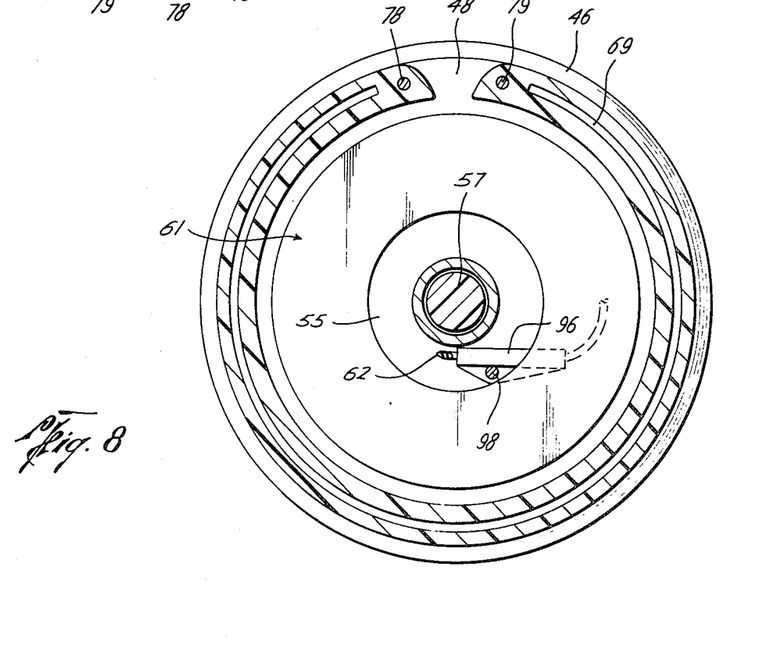
FIG. 8 is a cross-section of the cutting head of FIG. 3 taken along line 8—8.

Referring momentarily to FIG. 8, the line portion 62 from the spool 61 passes through a guide member 96 which is pivotally mounted on pin 98 to the cam plate 91. The guide member serves to more smoothly thread the cutting line from the spool 61 through the opening 94 onto the face 97 of the cam plate 91.

The face 97 carries cam means or unitary gripping members 100 which are adapted for progressively gripping the cutting line in proportion to its length extending into the cutting plane. These several members are seen more particularly in FIGS. 5 and 6 and 10 and 11. The gripping members can be a plurality of elements. However, these elements are integral in structure and function to provide a unitary gripping assembly. This assembly can be likened in function to the strap chains used for threading and unthreading large pipes. In another sense, these members in assembly resemble in function a multi-coiled rope threaded upon a windless capstan such as employed on ships requiring a line to be moved by a prime mover force using the control of a supplemental but modest energy source. The gripping members comprise articulated segments 101, 102 and 103 which encircle the round collar 93 carried on the cam plate. The cutting line extends from the opening 94 and encircles the collar 93 in a first loop and then encircles the several segments in a second loop. These articulated segments are interconnected by pivotal joints 106, 107 and 108. The joint 106 pivotally mounts the inner segment 101 upon a pin 104 carried by the cam plate 91. The pivoted joints 107 and 108 comprise conventional pins and openings carried on the segments 102 and 103. With this arrangement the cutting line in the first loop is gripped immediately adjacent its entry from the opening 94 onto the face 97 of the cam plate 91. Also, in its first turn or loop about the round collar 93, the cutting line is engaged by all the articulated segments 101, 102 and 103. Then, the second loop of the cutting line encircles the exterior of the segments. As a result of these first and second loops, centrifugal pull of the cutting line 41 into the cutting plane operates these segments to provide a self-energizing linkage applying dynamic gripping forces to control the extension length, and the rate of extension, of the cutting line 41 from the rotating head 39 into the cutting plane.

Figure 5:
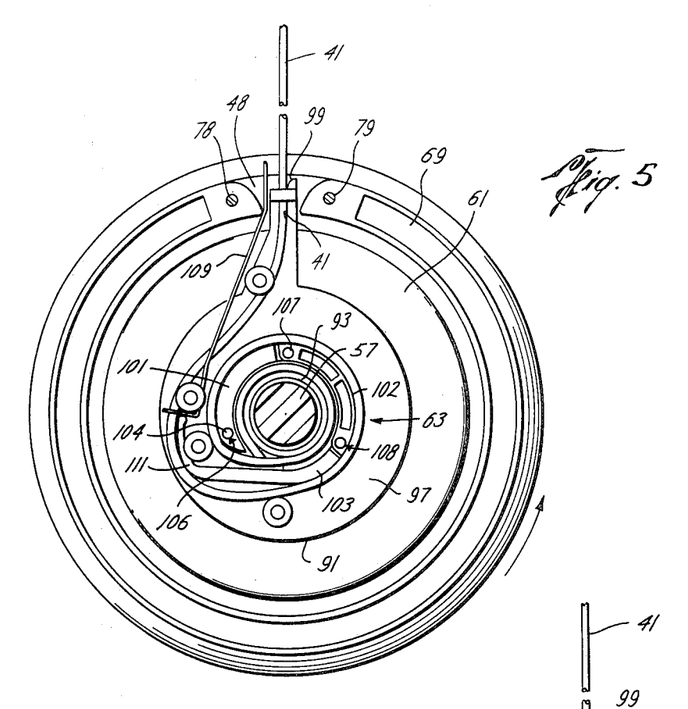
FIGS. 5 and 6 are cross-sections of the cutting head of FIG. 3 taken along lines 5—5 and 6—6 illustrating the cam mechanism in non-feeding and feeding functions, respectively.

In FIG. 5, the segments are shown in the locked position with the cutting line 41 extended to its predetermined maximum length from the cutting head 39. At this time, these segments have been pulled into the maximum clockwise position and also moved inwardly by the second loop of encircling cutting line. Thus, the segments securely hold the cutting line in the first loop against collar 93, and no further cutting line can be extended from the cutting head 39.

Figure 6:
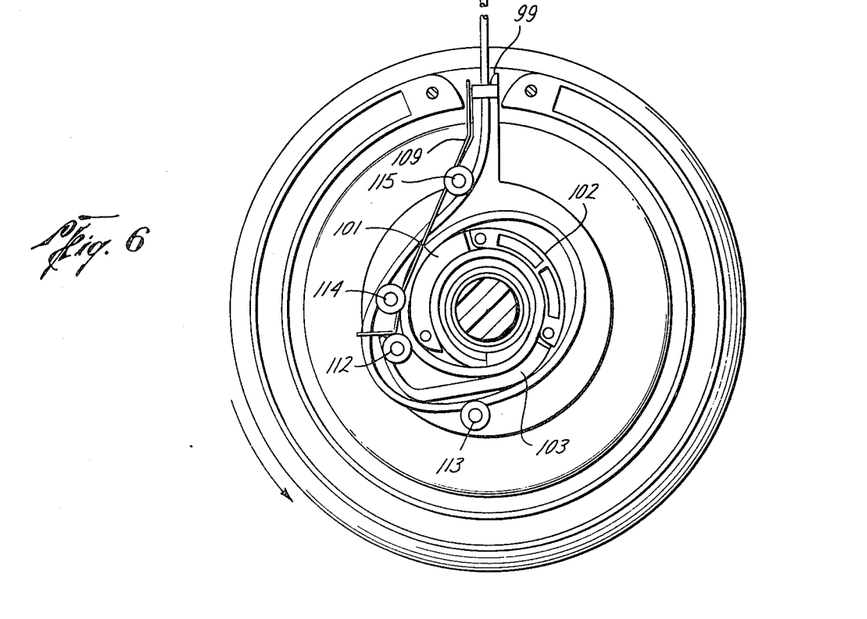

Referring to FIG. 6, the segments are released by the second loop of the encircling line proportionately to the length of cutting line to be extended. These segments move counterclockwise and open to release the cutting line in the first loop about the round collar 93. Under these conditions cutting line is extended from the rotating head 39.

It may be desirable at times to pull manually the cutting line 41 from the cutting head 39 in a non-rotating condition. For this purpose, a wire operating link 109 is provided in the head 39. This link at one end extends outwardly of the aperture 48 and inwardly at its other end into contact with an offset or bend 111 carried upon the segment 103. In FIG. 6 the link 109 is shown manually depressed inwardly into the aperture 48. As a result, the bent portion 111 is displaced and moves the segments counterclockwise and radially outward, as viewed in the drawing. The articulated segments 103, 102 and 101 are released fully from the first turn of cutting line surrounding the round collar 93 of the cam plate 91. Now, the cutting line 41 can be pulled gently by its exposed end and additional cutting line extended from the spool 61 through the cam mechanism 63. Whenever the desired amount of cutting line is pulled from the cutting head, the link 109 is released. Rotation of the head 39 moves the segments into locked condition as shown in FIG. 5 (if a predetermined maximum length of cutting line is extended into the cutting plane). Otherwise, the cam mechanism 63 will feed whatever additional length of line is necessary to extend it to the predetermined maximum length.

Figures 10, 11, 12:
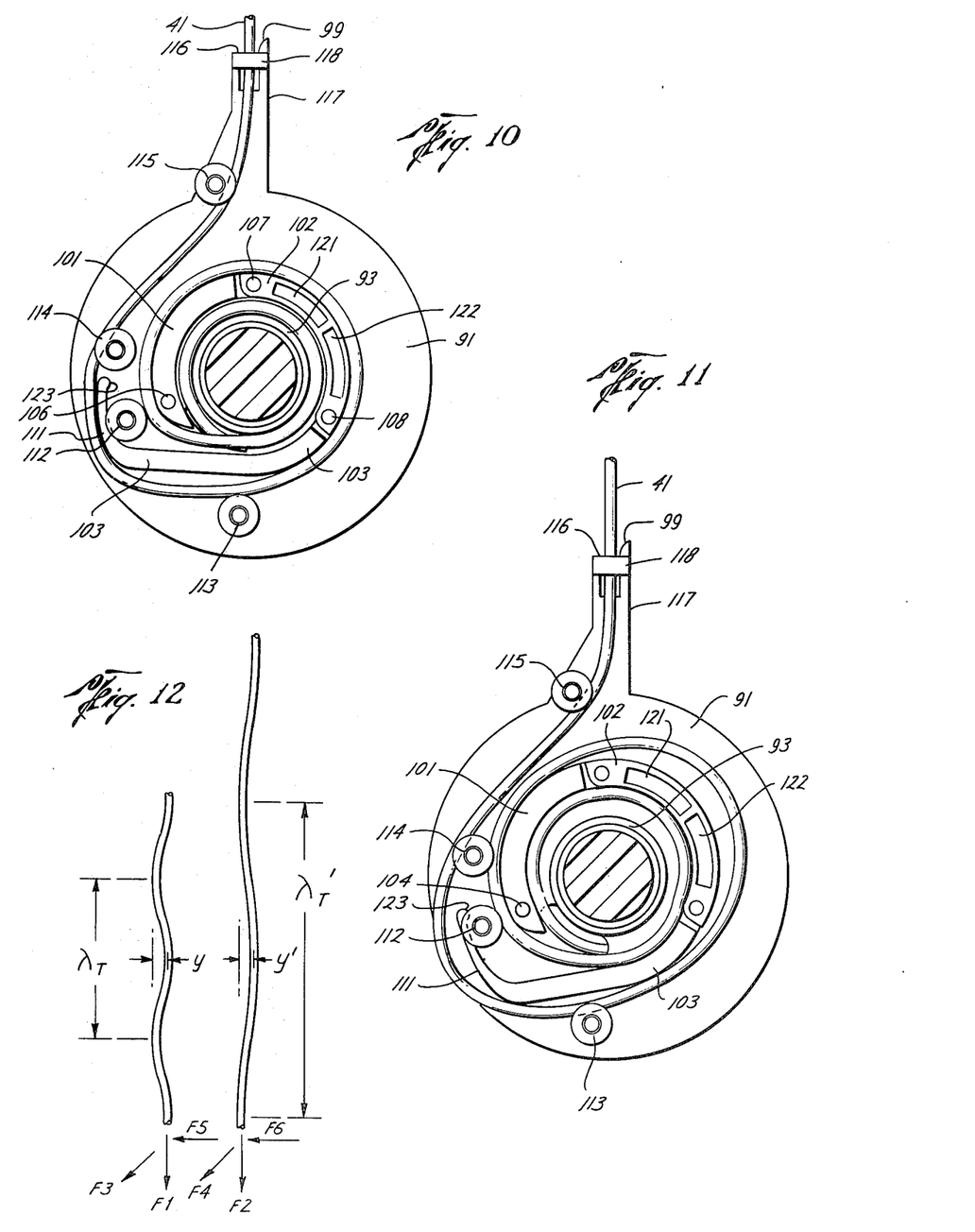
FIGS. 10 and 11 are enlarged plan views of the cam mechanism removed from the cutting head of FIGS. 5 and 6, respectively, as functioning in non-feeding and feeding of cutting line.
FIG. 12 is a pictorial representation of short and long cutting line lengths subject to transverse wave energy during vegetation cutting.

The operations of the cams can be more readily understood by reference to FIGS. 10 and 11 which show in enlargement the cams in the respective locked and line-extending positions. The cam plate 91 also carries grommets or thimbles 112–115 to assist in the sliding movement of the cutting line about the articulated segments 101, 102 and 103. These grommets may be omitted, if desired, in many applications. The grommet 112 serves a two-fold purpose: (1) Limiting the outward movement of the cutting line surrounding the segment 101; and (2) Limiting the counterclockwise movement of the segment 103 into a fully-locked position. The bent portion 111 carried on the segment 103 has an inside curve such that it cooperates with the grommet 112 to limit the inward movement of the segment 103 at the cam locked position when the cutting line 41 is at its maximum predetermined extended length in the cutting plane and avoids excessive gripping force being applied by the articulated segments on the first loop of cutting line. The grommets 113, 114 and 115 guide the cutting line about the cam linkage and radially outwardly from the cam plate 91 through a guide opening 116 provided on a longitudinal extension 117 carried on the cam plate 91. A roller can be mounted on the grommet 114, if desired. The guide opening 116 has an arch or bridge 118 formed upon the extension 117, and a round lip 99 to support the cutting line.

The articulated segments are arranged in a circular configuration with contours to provide a concentric gripping of the first turn of the cutting line about the collar 93. The segments are preferably constructed of very lightweight material, such as aluminum or magnesium alloys, since their function is not dependent principally upon their response to centrifugal force. Rather, the segments function by the direct action exerted upon them by the cutting line. The reduced pull of the cutting line 41 from centrifugal forces opens the first and second loops of the cutting line about the cams to provide directly the necessary control for extending the cutting line 41 to the predetermined maximum length from the rotating cutting head 39. More particularly, the segments, such as in segment 102, may have recesses 121 and 122 formed into them. Thus, the segments can be of a very lightweight construction relative to the mass of the cutting line in the first and second loops which encircles the collar 93 and these segments. Stated in another manner, the segments 101, 102 and 103 preferably have a relatively light mass so that much greater mass of the cutting line operates the cam mechanism of this invention.

With the arrangement of the cams as shown in the drawings, the gripping forces on the first loop of the cutting line is the greatest at the segment 101, less at the segment 102, and least at the segment 103. Obviously, the gripping forces by these segments progressively decreases as the cutting line in the first loop passes to the second loop. As a result, these articulated segments uniquely provide the function of extending the cutting line 41 into the cutting plane at a rate proportional to the length of cutting line to be extended to the predetermined maximum length. Stated in a different manner, the greater the length of cutting line extension needed, the faster the cutting line is fed through the articulated segments of the cam mechanism 63.

It has been found that the cutting line 41 during the cutting of vegetation undergoes vibrations of significant magnitudes and frequencies. The cutting line 41 vibrations enhance the operation of the cam mechanism of the present invention. More particularly, the cutting line 41 carries transverse vibrations during cutting operations as is shown in FIG. 12. In this figure, the lefthand portion represents a short cutting line reacting to centrifugal force $F_1$, angular force $F_3$, and a displacement force $F_5$ (which represents the impact of the tip of the cutting line upon vegetation). A similar representation in the righthand portion shows a long cutting line reacting to lesser related forces $F_2$, $F_4$, and $F_6$. Thus, short and long cutting lines produce vibrations of different displacements y and y' and at wavelengths T and T' in the transverse mode.

Figure 13:
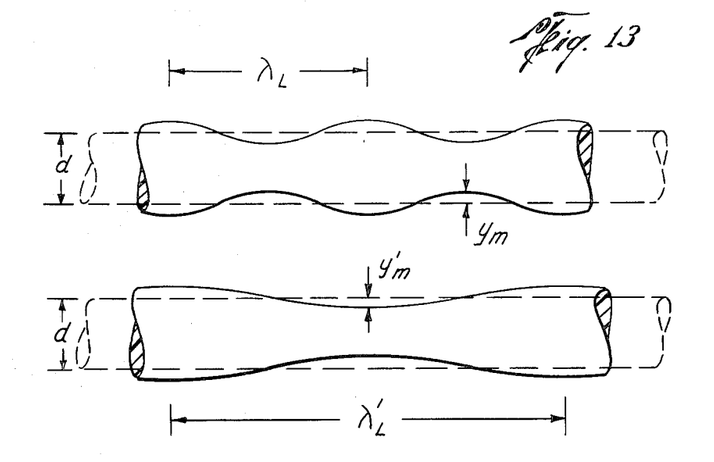
FIG. 13 is a pictorial representation of short and long cutting line lengths subject to longitudinal wave energy during vegetation cutting.

Referring to FIG. 13, the cutting line 41 also carries longitudinal waves during the cutting of vegetation. In the upper portion of FIG. 13, the line of short length is shown with a first wavelength L in the longitudinal wave, which results in the cutting line having what may be essentially shown as a reduced diameter d with a displacement value of $y_m$. At a longer cutting line, the longitudinal waves result in a longer wavelength L' with essentially the same reduction in diameter for displacement value of $y'_m$.

As a result, several forces exerted upon the tip of the cutting line 41, while actually cutting vegetation, produce not only transverse and longitudinal traveling waves, but a difference in the displacement magnitudes and wavelengths during cutting operations. These phenomena in the vibration of the cutting line are employed in the cam mechanism 63 so that the articulated segments are modulated or vibrated into pulsing-gripping forces on the cutting line. Therefore, dynamic friction conditions predominate between these gripping members or segments and the cutting line when the cutting line has less than the predetermined maximum length extending into the cutting plane. The coefficients of friction between static and dynamic line control conditions is approximately in the ratio 1.2 to 1.0.

The vibrations described relative to FIGS. 12 and 13 travel along the line 41 at essentially high velocities which may be between several hundred feet per minute (e.g., 200 ft./sec.) in the transverse mode and at the speed of sound in the longitudinal mode within the cutting line 41.

These vibrations, as represented in FIG. 11, travel on the cutting line 41 onto the segments which react in pulsing motion. The outer segment 103 is displaced to the greatest extent, the segment 103 is displaced to a lesser extent, and the segment 101 is displaced to the least extent, since it is pivoted at one end by the pin 104 to the plate 91. This progressively decreasing displacement from the outer towards the inner segments is proportional to the progressively expanding second and first loops of the cutting line. As the segments expand and uncoil, they release progressively the gripping forces on the cutting line from the second loop to the first loop about the collar 93. Although the cam mechanism 63 is shown in FIG. 11 as being in a static relatively fully-open position, the vibrations carried upon the cutting line 41 produce a constant motion in the segments. At this time, the cutting line in the second and first loops is pulsing, or expanding and contracting in reaction to the longitudinal and transverse waves carried upon the cutting line 41. In summary, the articulated segments are opening and closing responsive in frequency and displacement to these cutting line vibrations. As far as can be determined, these linkages are vibrating all the time when the cutting head 39 is rotating during the cutting of vegetation. Displacements of these segments is at a minimum whenever the cutting line 41 is at its predetermined maximum extension from the cutting head. It is believed that modulation of the articulated segments by the vibration of the cutting line provides for the pulsing-gripping of the cutting line such that dynamic friction conditions predominate over static friction conditions between the segments and especially the cutting line surrounding the collar 93 carried upon the cam plate 91. As a result, the cutting line readily moves through these segments to be extended whenever necessary, and by any amount of length extension until the cutting line is at its predetermined maximum extended length in the cutting plane.

In one construction, the cam mechanism 63 is formed of diecast or investment metals. For example, various types of aluminum or magnesium alloy materials can be employed as long as these segments have sufficient resistance to abrasion and work throughout an acceptable life. It has been found for the purposes of invention that the lighter the construction of the articulated segments, the better the cam mechanism 63 will function.

The segment 103 has a projecting nose 123 which locks behind the grommet 112 to prevent the segments 110–113 from opening beyond a certain enlargement which determines the maximum extension rate for the cutting line 41. For example, when the cutting line has been reduced by wear or severing to a very short extension from the cutting head 39, the maximum opening of the articulated segments may provide a cutting line maximum feed rate of approximately one-half foot per minute.

Figure 14:
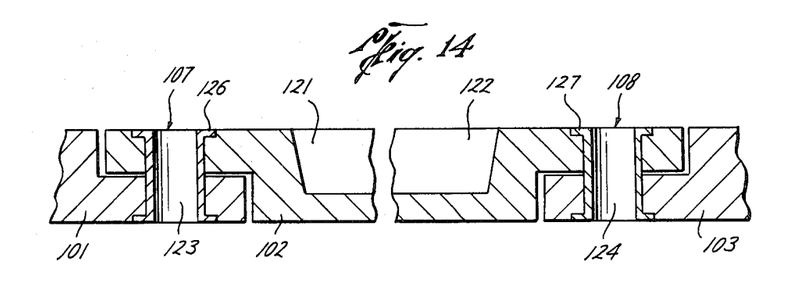
FIG. 14 is a partial vertical section of the articulated three-link cam from the cutting head of FIG. 10.

The construction of the lightweight segments 101, 102 and 103 is displayed in enlarged cross-section in FIG. 14. Here the segment 102 is shown with recesses 122 and 123, wherein material is removed for maximum weight reduction. The pivotal joints 107 and 108 are formed by pins received within openings in the segments. Tubular grommets 123 and 124 are passed through openings in the segments and have flanged portions 126 and 127 provided thereon for producing the necessary secure but pivoted interconnection between these segments.

Figure 15:
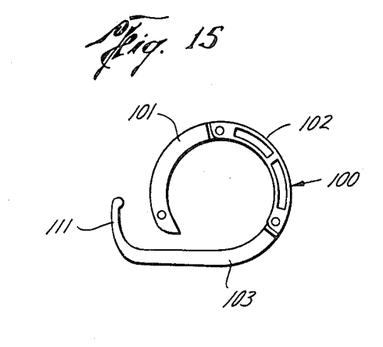
FIG. 15 is a plan view of the three-link cam removed from the cutting head of FIG. 10.

The articulated segments are shown as unitary gripping members 100 in FIG. 15 for direct placement upon pin 104 of the cam plate 91. Thus, should the cutting head 39 malfunction, the defective segments are removed from the cam plate 91 and new gripping members 100 substituted.

Figure 16:
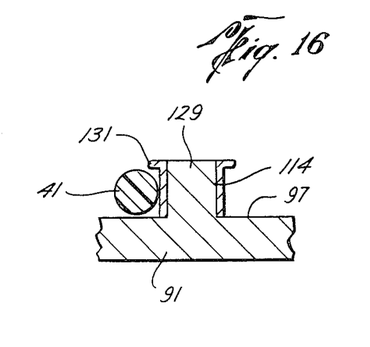
FIG. 16 is a partial vertical section taken through the cutting line held by a line-retainer grommet on the cam mechanism shown in FIG. 9.

The securing of the cutting line 41 in sliding contact upon the face 97 of the cam plate 91 is shown in FIG. 16. The grommet 114 is received about a pin projection 129 carried upon the face 97. The grommet 114 has a flattened or radially-extending cap portion 131 which projects slightly over the cutting line 41 tensioned against the grommet 114. This projection 131 reduces the tendency of the cutting line 41 to become unhooked or from moving past the uppermost surface of the pin 129. Preferably, the grommets employed in conjunction with the cam mechanism 63 may be brass or other suitable bearing-like material and can carry low-friction rollers 110.

Referring now to FIG. 9, there is shown in detail a dissassembled view of the cutting head 39 of the present invention. It will be apparent that the spool 61 is a separate element which can be readily replaced within the hub 46 when the cutting line coiled therein is expended, or for other reasons. In like manner, the cam plate and/or the articulated segments 101, 102 and 103 may be readily replaced as a unit, if desired. Of special note, the pins 78 and 79 are received in openings 76 and 77 of the cover plate 64 and hold it in a non-rotatable condition relative to the hub 46. The spacial placement of the holes 71 and 72 in the cover 47 and the cover plate 64, respectively, can be readily noted.

Referring now to FIGS. 17–20, a second embodiment of the unitary gripping members will be described. In this embodiment (as can be best seen in FIG. 18), the articulated gripping members are provided by a circular, flexible, one-piece plastic body 130. The body has integrally-formed therein an inner part 132, an intermediate part 133, and an outer part 134, which parts correspond respectively to the segments 101, 102 and 103 in function and result, as was previously described. The other portions of the cam plate and head 39 are identical to that described for the preceeding embodiment. The plastic body 130 carrying these parts can be formed by molding from a suitable plastic, such as high-temperature polysulfone plastic. The body 130 carries an opening 136 which is received over the pin 104 carried upon the face 97 of the cam plate 91. The plastic body 130 has arcuate grooves 137, 138 and 139, to provide a more uniform progressive gripping force which is superior in control function over the three-segment metal cam mechanism 63 previously described. The grooves are separated by webs 141, 142 and 143, which serve to basically produce the inner, intermediate and outer part equivalents of the plastic body 130. The plastic body 130 has parallel free ends 144 and 146, which are compressed together by the cutting line during the progressive gripping forces provided by this element as the cutting line reaches the predetermined maximum extended length. More particularly, the end 146 has a curved exterior surface 147, which complements the curve of the cutting line in the second loop when the plastic body 130 has securely gripped the cutting line 141 against any further displacement at its predetermined maximum cutting length in the cutting plane.

Figures 17, 18, 19, 20:
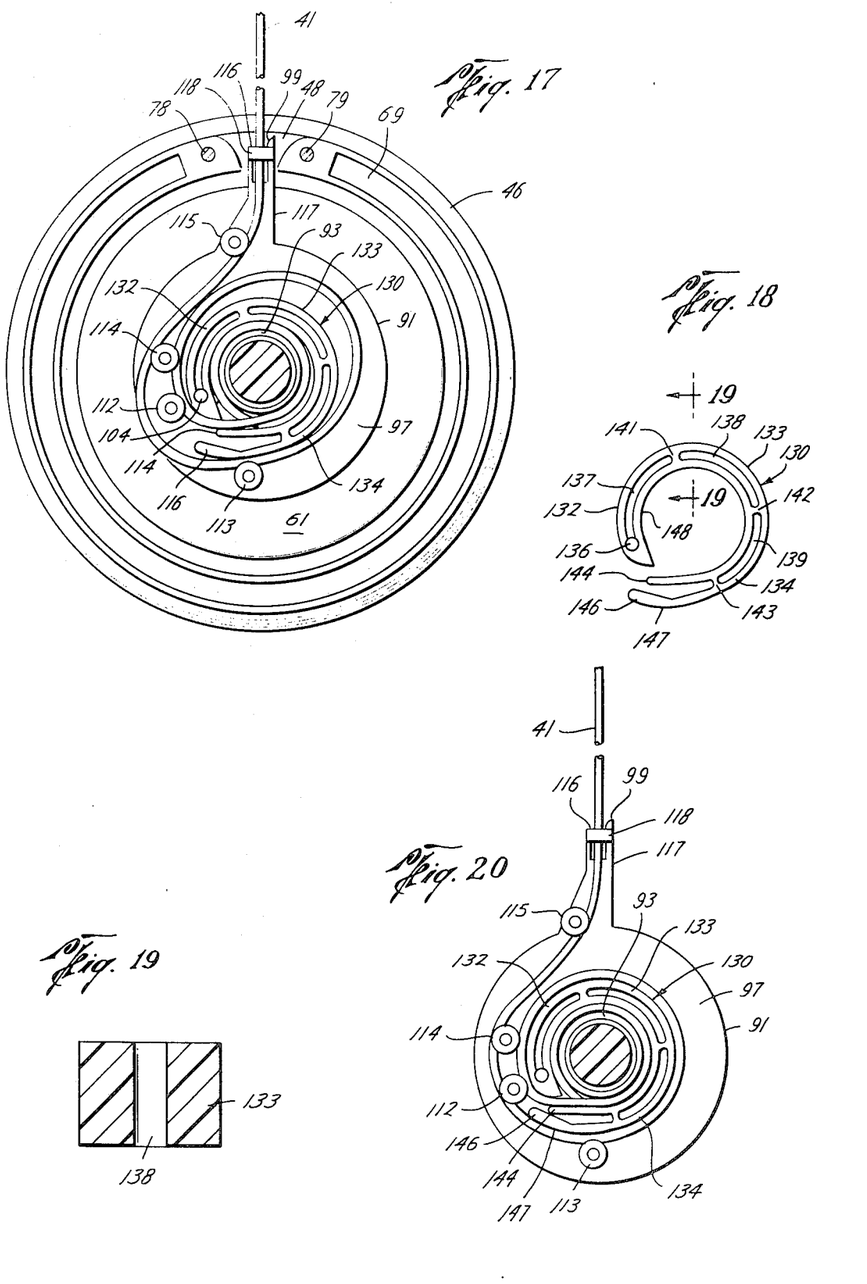
FIG. 17 is a cross-section like FIGS. 5 and 6 but showing a second cam embodiment (one-piece plastic body) used in the present cutting head in the line-feeding function.
FIG. 18 is a plan view of the second cam embodiment.
FIG. 19 is a vertical section of the cam embodiment of FIG. 18 taken along line 19—19.
FIG. 20 is a plan view of the cam mechanism of FIG. 17 in the line non-feeding function.

In FIG. 17, the plastic body 130 is shown in the line-feeding condition where the cutting line 41 through vibration is expanded in the second loop about the plastic body 130. At this time, the plastic body 130 has released the gripping force holding the cutting line at its first loop against the collar 93. The various grommets associated with the cam plate 91 keep the cutting line from expanding in enlarging loops beyond their relative position shown in this figure. At this figure, the cutting line 41 will feed at a progressive rate relative to the length of line which must be extended into the cutting plane to reestablish the predetermined maximum length established for this particular plastic body 130. When the cutting line has reached the predetermined maximum length extended into the cutting plane as is shown in FIG. 20, the cutting line has compressed the plastic body 130, and in particular, the free ends 144 and 146, in such a manner as to securely lock the cutting line at its first loop between the plastic body 130 and the collar 93. At this time, no further cutting line can be extended from the cutting head 39 into the cutting plane. It will be apparent that the vibrations on the cutting line 41 provide the same function as the segments 101-103 in progressively opening the various parts of the plastic body 130. The part 134 opens more quickly and further than the intermediate part 133, and part 133 opens further and more quickly than the inner part 132 pivoted upon the pin 104. In like manner, the vibrations insure that the plastic body 130 is so opened that the greater amount of cutting line needed to be extended into the cutting plane, the faster its rate of feeding from the cutting head through the plastic body 130 and outwardly through the aperture 48 into the cutting plane. Thus, the plastic body 130 provides for progressive gripping of the cutting line in exactly the same manner as for the previously described articulated segments 101, 102 and 103. The particular proportionate gripping forces exerted by the cam 130 are regulated by the particular resiliency and frictional characteristics of the plastic from which this body is molded, and the length and size of the annular groove formed therethrough. For example, in momentary reference to FIG. 9, there is shown a cross-section taken through the intermediate segment 133, which view shows the groove 138. If desired to have a cam of a given plastic material but must more flexible than other types of bodies, the groove 138 can be larger in cross-sectional area relative to the cross-sectional area of the overall intermediate segment 133. Alternatively, the groove 138 can be decreased in area of cross-section so that the intermediate member 133 is more rigid and less flexible in responding to the vibrations and the gripping of the cutting line 41. In addition, the length and space between the open ends 144 and 146 can be adjusted so that the gripping of the cutting line 41 at its fully-extended predetermined maximum length is at a particular holding magnitude. The longer and larger the end 146 is relative to the end 144, the greater the gripping force exerted upon the first loop of the cutting line between the collar 93 and the plastic body 130. This arrangement of ends 144 and 146 is very similar to the bent end 111 on the segment 103. Also, the clearance of the plastic body 130 along its inner surface 148 which is in contact with the first loop of cutting line regulates the rate of feeding of the cutting line when the cutting line 41 has been reduced to its shortest dimension at the aperture 48. Stated in another manner, the greater the clearance between the inner surface 148 of the plastic body 130, and the adjacent enclosed first loop of cutting line, the greater the feed rate of the cutting line when the cutting line has been reduced to its minimum dimension in extension from the aperture of the cutting head 39.

The plastic body 130 forms an articulated cutting element much more uniform in response and extension of the cutting line than the articulated metal segments described in earlier embodiments. However, as with active members composed of a plastic material, expensive molds for injection are required. Also, close quality control of the plastic material is required to make uniform functioning plastic bodies 130 for use in the cam mechanism 63 of the present invention. However, a properly prepared plastic body 130 is a direct substitution for the articulated segments 101-103. One advantage of the plastic body 130 is its natural resiliency combined with the tendency of a flexible polymeric cutting line 41 to uncoil the second loop about the cam member. As a result, the plastic body 130 automatically adjusts to the enlarged or expanded position shown in FIG. 17 when the cutting head 39 is stationary. Thus, a mechanical unlocking mechanism, such as the wire link 109, is not needed to feed manually cutting line 41 from the cam mechanism 63, but it is more convenient.

Referring now to FIGS. 21-26, another embodiment of a cutting head arranged according to the present invention with a cam means for controlling extension to a predetermined maximum length of the cutting line will be described. This cutting head 149 may be arranged for threaded attachment to the threads 54 carried upon drive shaft 44 of the trimmer 31. The cutting head 149 has a cylindrical hub 151 which has a cylindrical cavity 152 in which is received a coiled supply 153 of cutting line. Preferably, the cutting line supply 153 is carried within a removable spool 154. The spool has a cylindrical housing containing an interior ridge 156 behind which is held the coiled supply 153. A returning lip 157 on the spool 154 contains the coiled supply 153 against displacement by axial forces. The spool 154 carries a top cover 158 which has a side opening 159 through which the cutting line is passed to the cam mechanism 163, and then for extension from an aperture 164 outwardly of the head into the cutting plane. The cutting line is controlled in extension through the cam mechanism 163 to a predetermined maximum length in the cutting plane, as was described for the preceeding embodiments.

Figure 21:
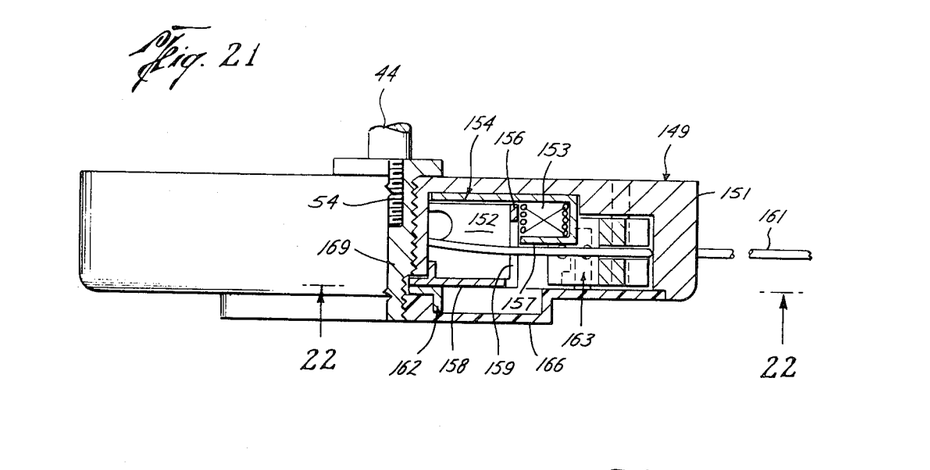
FIG. 21 is an elevation, partially in vertical section, of another cutting head embodiment arranged with a novel cam mechanism according to the present invention.

More particularly, the cam mechanism 163 includes unitary gripping members which are adapted for progressively gripping the cutting line proportionately in magnitude to its length extending into the cutting plane. The greater the length of cutting line 161 extending into the cutting plane, the greater the gripping forces that the cam mechanism 163 exerts upon it. At the maximum extension of the cutting line 161 into the cam plane, for practical purposes, the cutting mechanism 163 holds or grips the cutting line securely against further extension. Alternatively, the greater the length of the cutting line 161 which must be extended into the cutting plane, the faster the extension of the cutting line by the cam mechanism 163.

Figure 22:
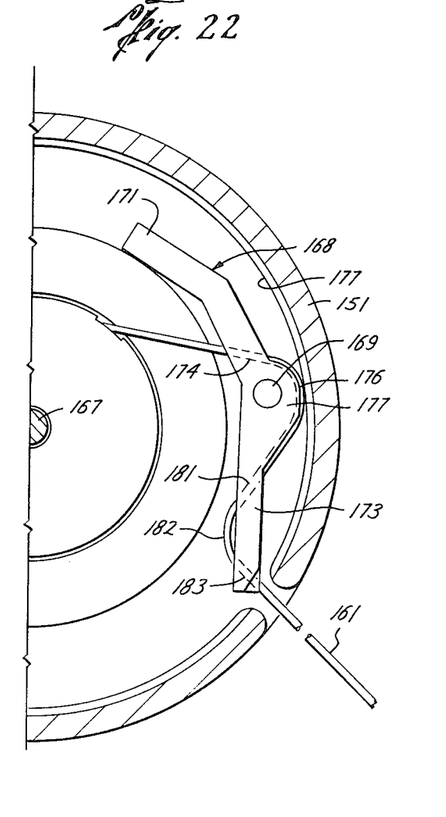
FIG. 22 is a partial cross-section of the cutting head shown in FIG. 21 with the cam mechanism in line non-feeding function.
Figure 23:
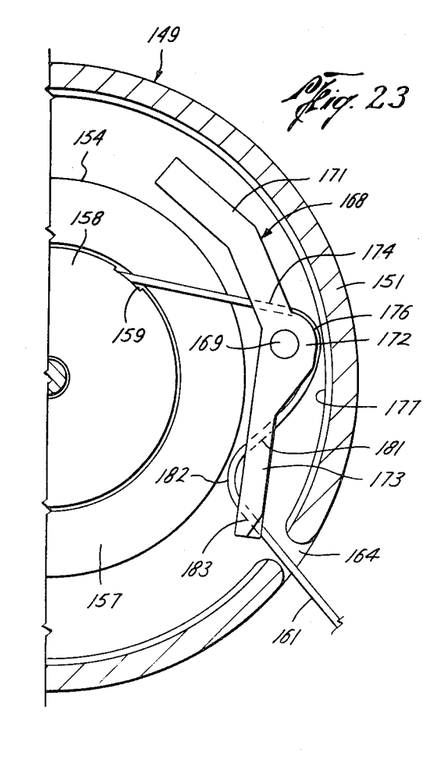
FIG. 23 is a view like FIG. 22 but with the cam mechanism in line-feeding function.

The cam mechanism 163 and the spool 154 are held within the cavity 152 by a threaded cover 166 which is carried upon an adapter 167 threaded to the drive shaft 44. In this cam mechanism 163, the gripping members are provided by a metal elongated member 168 which is pivotally mounted within the body 151 upon an axial pin 169. The member 168 has an inner part 171, intermediate part 172 and an outer part 173. The inner part 171 carries an opening 174 which passes the cutting line in a first loop 175 from the spool 154 through the member 168 and onto a curved cam surface 176 carried on the intermediate part 172 adjacent the pin 169. The rounded cam surface 176 is eccentric relative to the pivoting of the member 168 upon the pin 169. The surface 176 is placed adjacent the inner wall surface 177 of the body 151. Movement of the inner part 171 towards the inner wall 171 moves the cam surface 176 away from the wall surface 177 and allows the cutting line 161 to be pulled from the spool and extended outwardly of the aperture 164 into the cutting plane. The line 161 passes from the curved cam surface 176 onto the outer part 173 of the member 168. The cutting line passes through the part 173 by a first opening 181 and then in a second loop 182 through another opening 183 for extension through the aperture 164 and outwardly of the head 149.

With the member 168 arranged as is shown in these figures, movement of the inner part 171 inwardly towards the drive shaft 44 causes the cam surface 176 to move towards the inner wall 177 and secure the cutting line 161 against further extension from the rotating cutting head 149. Reverse movement of the part 171 causes cutting line to be extended from the head.

The functions of the several openings 174, 181 and 183 in conjunction with the first and second loops, the cam surface 176, and the several parts 171, 172 and 173 of the member 168 provide the same progressive gripping and response to cutting line vibrations as occurs in the previous cam mechanism embodiments. More particularly, when the cutting line 161 is at its maximum extension from the cutting head 149, the inner part 171 has moved into near contact with the side surface of the spool 154 and the cutting line 161 is securely held against further extension. As can be seen in FIG. 3, the loop 182 of the cutting line between the openings 181 and 183 in the part 173 is relatively snug. The small second loop 182 keeps the cutting line in the first loop 175 about the cam surface 176 from being substantially displaced by vibrations carried upon the cutting line. At these conditions, the maximum extension to the predetermined length of the cutting line 161 is reached and held securely.

Figures 24, 25:
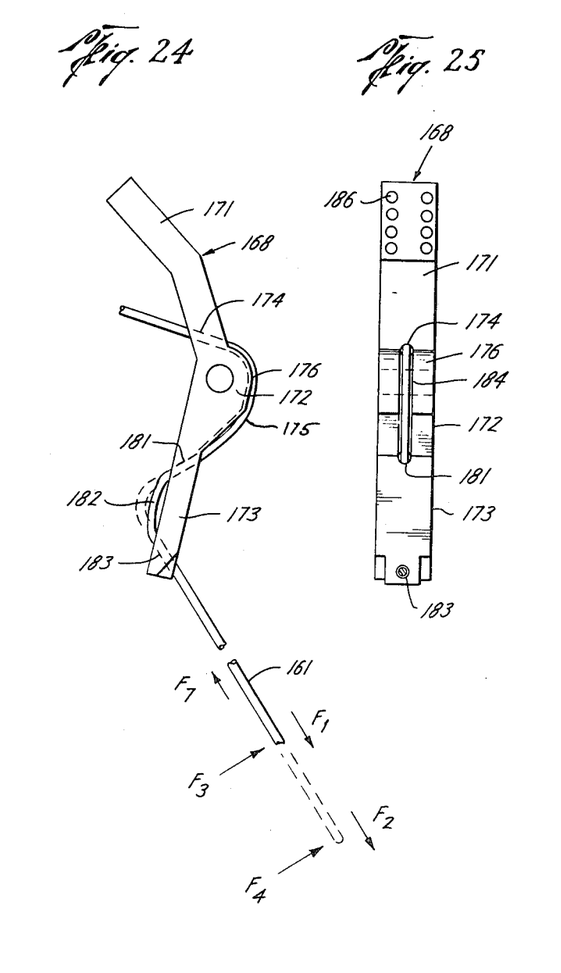
FIG. 24 is a plan view of the cam from FIGS. 22 and 23 showing the threading therethrough of the cutting line for short and long extended lengths.
FIGS. 25 and 26 show the left and right side faces, respectively, of the cam illustrated in FIG. 24.

Referring now to FIG. 24, the effect of vibrations upon the cutting line and the forces exerted upon the cutting line 161 which extend outwardly into the cutting plane are shown diagrammatically. The second loop 182 of the cutting line is the smoothest (and tightest) when the cutting line 161 is at its maximum extension to the predetermined distance from the cutting head 149. At this time the maximum forces $F_2$ and $F_4$ are applied to the cutting line. The force $F_7$ (represented by the inward arrow) is a combination of traveling wave forces including both transverse and longitudinal types.

When the cutting line is shortened and acted upon by reduced forces $F_1$ and $F_3$, the force $F_7$ from the transverse and longitudinal waves increases relatively to them. Now, the force $F_7$ has the capacity to perform two functions: (1) Increase the size (and looseness) of the loop 182 between the openings 181 and 182 and loop 175 about the cam surface 176; and (2) Move the member 168 to the line-feeding position shown in FIG. 23. The shorter the cutting line 161 which extends from the cutting head 141, the greater the loops 175 and 182 expand, and the greater rate and length of the loosened line fed around the cam surface 176 from the spool 154. Thus, the traveling wave vibrations provide for expanding the loop 182 and opening progressively from the cam surface 176 securing the line against the inner wall 177. When the cam surface 176 is moved away from the wall 177, the cutting line 171 is fed at a rate which is determined by the length of cutting line to be extended into the cutting plane. The vibrations of a short cutting line act to increase first the loop 182, then the loop 175, and move part 171 outwardly. The shorter the length of extended cutting line, the faster the cutting line is fed about the cam surface 176 and outwardly into the cutting plane. These functions are identical to the metal segmented cams 100 or plastic body 130 in the preceeding described embodiments.

In particular, the cam surface 176 in conjunction with the openings 174, 181 and 183, loops 175 and 182, and the counterbalancing forces of the inner and outer parts 171 and 173, provides for the progressive gripping of teh cutting member by forces which are indirectly proportional to the length of cutting line to be extended from the cutting head 149 into the cutting plane. In addition, the member 168 is acted on or moved by the vibrations represented by the force $F_7$ to provide a pulsing-gripping of the cutting line under dynamic friction conditions. As a result, the cutting line is immediately fed about the cam surface 176 whenever its length decreases below the predetermined maximum length of cutting line desired in the cutting plane. Also, this arrangement provides for greater rates of cutting line extension, the shorter the extended cutting line 161 has become through wear or severance. As can be appreciated with inspection of FIG. 23, these gripping forces increase progressively from the opening 174, about the loop 175 which encircles cam 176, and through the loop 182 residing between the openings 181 and 183. It is to be noted that these progressive gripping forces applied by the member 168 in its present arrangement are inversely responsive to the effects caused by the vibrational forces $F_7$ carried inwardly along the cutting line 161 towards the spool 154. The loop 182 will be enlarged by these vibrational-induced forces and reduce progressively the gripping forces provided by the outer intermediate member carrying the cam surface 176, then the loop 175, and lastly the inner member 171 through the opening 174. If the arrangement of these surfaces can be visualized as forming a near-complete circle, its relationship to the driving or pulling or a multi-coiled rope on a capstan is identical to those effects in elements, function and results as were described for the preceeding cam mechanisms 63.

Figure 26:
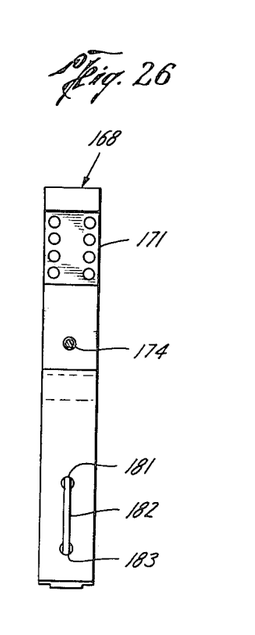

The construction of the lever member 168 can be appreciated more fully by reference to FIGS. 25 and 26, wherein the exterior and the interior side surfaces of this member. The cam surface 176 may contain a groove 184 to further control the cutting line in loop 175 as it passes between the member 168 and the inner wall 177 of the body 151. The member 168 is balanced between the masses of the arms 171 and 173 to provide the proper motion (displacement) reaction to the vibrations carried upon the cutting line 161. For this purpose, either counterweights or weight removal can be employed. For example, the inner part 171 has a plurality of bores or holes 186 to lighten the inner part. As a result, the member 168 pivots more quickly towards the full line-feeding position shown in FIG. 23, rather than the no line-feeding position shown in FIG. 22.

In the several embodiments of the cam mechanism for controlling extension of the cutting line to a predetermined maximum length through the aperture into the cutting head from a rotating cutting head, it is seen that the cutting line is the activating force upon the cam mechanism to produce the desired control function. The vibrations carried upon the line for progressively acting to open the various cam elements are equally suitable for use in all the embodiments to provide pulsing-gripping forces. In addition, these several inner, intermediate and outer parts of the various cam mechanisms provide for a progressive gripping of the cutting line in proportion to its length extending from the cutting head into the cutting plane. In accordance with this invention, there has been described a cam mechanism capable of feeding cutting line as it is needed and at progressive rates to quickly reestablish the predetermined maximum cutting length extending from the cutting head into the cutting plane. The cutting head can be constructed of suitable materials such as plastic materials, and in particular Nylon 6 polymer in both the hub, covers, ball members, and other parts including spools and cutting line. Other portions of the cam mechanism can be diecast or investment cast from various metals such as aluminum and magnesium alloys. If desired, the entire head may be constructed of such material except for the flexible non-metallic cutting line. In addition, the various cam mechanisms can be employed as replaceable elements and in subcombinations of the invention herein described.

Although there has been described a paricular arrangement of functions and elements in the various cam mechanisms employed in the heads of the present invention, it is not intended that this description is the only possible arrangement of these elements to produce the results of this invention. In this regard, the functions and elements may be altered to produce the same result, and all that is required for these elements is a cam mechanism that secures the cutting line from further extension when it is at its maximum predetermined length extending into the cutting plane. Also, this mechanism releases the cutting line as needed when the cutting line has been reduced by wear or loss, irrespective of the actual length required for complete extension. In addition, this cam mechanism provides for the automatic extension of the cutting line to maintain it at the predetermined maximum rate and to feed this line in proportion to the amount of line that needs to be replaced.

From the foregoing, it will be apparent that there has been herein provided a novel apparatus for cutting vegetation which provides a convenient and safe means for extending cutting line without any attention of the operator. Also, certain changes or alterations in the present invention may be made without departing from the spirit of the invention. These changes are contemplated by and within the scope of the appended claims which define the invention. Also, several of the elements may be employed as subcombinations of the overall present apparatus. Additionally, the present description is intended to be taken as an illustration of this invention.

What is claimed is:

1. An apparatus for cutting vegetation, comprising:
   (a) a head rotatable about an axis of rotation and said head having a peripheral aperture;
   (b) said head carrying an annular cavity to provide a storage area for a cutting line;
   (c) spool means including a coil of said cutting line mounted in said cavity and journaled therein for rotation freely about the rotational axis of said head;
   (d) a flexible non-metallic cutting line disposed in a coiled portion about said spool means with a free end of said cutting line extending radially outwardly through said aperture into a cutting plane;
   (e) cam means for controlling extension of said cutting line through said aperture into the cutting plane to a predetermined maximum length;
   (f) said cam means including an elongated member pivotally mounted in said head and provided with rounded cam surfaces for gripping said cutting line, said elongated member having adjacent said aperture first, second and third openings, and said cutting line extending from said spool means progressively gripped by passage through said first opening and about said rounded cam surfaces, and then with a reversing loop through said second and third openings before passing through said aperture and into the cutting plane;
   (g) said elongated member being provided with counterbalance parts extending on opposite sides of its mounting point to said head and vibration of said cutting line inducing movement of said elongated member and said cutting line whereby said cutting line is continuously extended from said aperture when a length less than the predetermined maximum length extends in the cutting plane.

2. The apparatus of claim 1 wherein said first, second and third openings guide said cutting line through said elongated member in substantially circular loops of sufficient dimension that the resilience of said cutting line provides a biasing force for opening such loops in response to vibrations of said cutting line.

3. The apparatus of claim 1 wherein said circular loops provide substantially in total of a complete circle in the curvature of said cutting line about said elongated member.

4. The apparatus of claim 1 wherein vibration of said cutting line progressively enlarges the circular loops from the first opening about the rounded cam surfaces and then in the circular loops about the second and third openings whereby the progressive gripping of said cutting line by said elongated member proportionately to enlargements in the circular loops of said cutting line.

5. The apparatus of claim 1 wherein:
   said elongated member is metal.

6. The apparatus of claim 1 wherein:
   the mass of one of said counterbalance parts being reduced sufficiently with respect to the mass of the other counterbalance part that said elongated member pivots toward a position to provide line feeding into said cutting plane faster than toward a position to prevent line feeding into said cutting plane.

7. An apparatus for cutting vegetation, comprising:
   a head rotatable about an axis of rotation and said head having at least one peripheral aperture;
   said head carrying a supply of cutting line;
   said cutting line being flexible and non-metallic with a free end extending outwardly from said head through said aperture into a cutting plane;
   cam means for controlling extension to a predetermined maximum length of said cutting line through said aperture into the cutting plane during the cutting of vegetation, said cam means comprising an elongated member pivotally mounted in said head and provided with rounded cam surfaces for progressively gripping said cutting line proportionately to its length extending into the cutting plane, said elongated member adjacent said aperture having first, second and third openings therein, and said cutting line extending from said supply being progressively gripped by passage through said first opening and about said rounded cam surfaces, and then with a reversing loop through said second and third openings before passing through said aperture from said head into the cutting plane; and
   said cam means being acted on by vibration of said cutting line into a pulsing gripping of said cutting line whereby dynamic friction conditions predominate between said cam means and said cutting line.

8. The apparatus of claim 7 wherein said elongated metal member is pivotally mounted at its mid-point to said head and vibration of said cutting line induces substantially continuous movement of said elongated member whereby said cutting line is continuously extended from said aperture when a length less than the predetermined maximum length extends in the cutting plane.

9. An apparatus for cutting vegetation, comprising:
   a head rotatable about an axis of rotation and said head having a peripheral aperture;
   said head carrying an annular cavity to provide a storage area for a cutting line;
   spool means including a coil of said cutting line mounted in said cavity and journaled therein for rotation;
   a flexible non-metallic cutting line disposed in a coiled portion about said spool means with a free end of said cutting line extending radially outwardly through said aperture into a cutting plane;
   cam means for controlling extension of said cutting line through said aperture into the cutting plane to a predetermined maximum length;
   said cam means including an elongated member mounted for pivotal movement on said head and provided with cam surface means for gripping said cutting line, said elongated member having adjacent said aperture an opening, and said cutting line extends from said spool means about said cam surface means, and then with a reversing loop through said opening before passing through said aperture and into the cutting plane;
   said elongated member being provided with parts extending on opposite sides of the mounting point of said elongated member on said head, said opening being formed in one of said parts and the other of said parts acting as a counterweight to said one part whereby a change in a force acting to extend said cutting line into the cutting plane caused by shortening of said cutting line to less than a predetermined length induces movement of said elongated member whereby said cutting line is extended from said aperture when a length less than the predetermined maximum length extends in the cutting plane.

* * * * *